(12) United States Patent
Hecker et al.

(10) Patent No.: US 12,741,617 B2
(45) Date of Patent: Sep. 22, 2026

(54) REDUNDANT BRAKING SYSTEM AND METHOD FOR OPERATING SUCH A BRAKING SYSTEM

(71) Applicant: Knorr-Bremse Systeme Fuer Nutzfahrzeuge GmbH, Munich (DE)

(72) Inventors: Falk Hecker, Markgroeningen (DE); Oliver Jundt, Hessigheim (DE); Adnan Mustapha, Maulbronn (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 922 days.

(21) Appl. No.: 17/292,709

(22) PCT Filed: Oct. 22, 2019

(86) PCT No.: PCT/EP2019/078752
§ 371 (c)(1),
(2) Date: May 10, 2021

(87) PCT Pub. No.: WO2020/099075
PCT Pub. Date: May 22, 2020

(65) Prior Publication Data
US 2021/0394721 A1 Dec. 23, 2021

(30) Foreign Application Priority Data
Nov. 13, 2018 (DE) ..................... 10 2018 219 378.9

(51) Int. Cl.
*B60T 7/04* (2006.01)
*B60T 8/94* (2006.01)
(Continued)

(52) U.S. Cl.
CPC ................ *B60T 7/042* (2013.01); *B60T 8/94* (2013.01); *B60T 13/662* (2013.01); (Continued)

(58) Field of Classification Search
CPC .......... B60T 7/042; B60T 8/94; B60T 13/662; B60T 13/741; B60T 17/221;
(Continued)

(56) References Cited

U.S. PATENT DOCUMENTS 5,954,407 A * 9/1999 Schramm ............. B60T 8/3255 303/155
7,866,761 B2 * 1/2011 Gerum .................... B60T 8/321 303/127
(Continued)

FOREIGN PATENT DOCUMENTS

CN 105916746 A 8/2016
CN 106938646 A 7/2017
(Continued)

OTHER PUBLICATIONS

International Search Report dated Jan. 14, 2020 for PCT/EP2019/078752.

*Primary Examiner* — Robert A. Siconolfi

(57) ABSTRACT

A brake system for a vehicle for acquiring at least one status variable for controlling the brake system, including: a primary control unit for controlling the brake system by at least one actuator and taking into account the at least one status variable; and a redundancy control unit for controlling the brake system by part of the at least one actuator and taking into account part of the at least one status variable, in which the brake system is configured such that, when at least one switch-over condition is satisfied, the brake system is no longer controlled exclusively by the primary control unit and is at least partially controlled by the redundancy control unit. Also described are a related method and a computer readable medium.

22 Claims, 3 Drawing Sheets

(51) Int. Cl.
*B60T 13/66* (2006.01)
*B60T 13/74* (2006.01)
*B60T 17/22* (2006.01)

(52) U.S. Cl.
CPC .......... *B60T 13/741* (2013.01); *B60T 17/221* (2013.01); *B60T 2220/04* (2013.01); *B60T 2250/04* (2013.01); *B60T 2270/402* (2013.01); *B60T 2270/413* (2013.01)

(58) Field of Classification Search
CPC ............. B60T 2220/04; B60T 2250/04; B60T 2270/402; B60T 2270/413
See application file for complete search history.

(56) References Cited

U.S. PATENT DOCUMENTS

| | | | | |
|---|---|---|---|---|
| 2008/0238185 | A1* | 10/2008 | Craig | F16D 65/18 303/3 |
| 2017/0240147 | A1 | 8/2017 | Kotera et al. | |
| 2017/0297546 | A1 | 10/2017 | Takeda et al. | |
| 2018/0056959 | A1 | 3/2018 | Pennala et al. | |
| 2018/0215368 | A1 | 8/2018 | Isono | |
| 2019/0152459 | A1 | 5/2019 | Dieckmann et al. | |

FOREIGN PATENT DOCUMENTS

| | | | |
|---|---|---|---|
| CN | 108162766 | A | 6/2018 |
| DE | 102008009043 | B3 | 5/2009 |
| DE | 102017216118 | A1 | 4/2018 |
| EP | 2719593 | A1 | 4/2014 |
| FR | 2952886 | A1 | 5/2011 |
| KR | 20130037751 | A | 4/2013 |

* cited by examiner

REDUNDANT BRAKING SYSTEM AND METHOD FOR OPERATING SUCH A BRAKING SYSTEM

FIELD OF THE INVENTION

The present invention relates to a redundant brake system, in particular for road vehicles, and to a method for operating such a brake system.

BACKGROUND INFORMATION

Utility vehicles with highly automated driving functions which relieve the driver, at least for a limited time, of the control function and responsibility for control, that is to say can be operated, for example, autonomously, must, when any fault occurs, continue the control of the vehicle until the driver assumes control of the vehicle again.

The "fail-operational" system property which is derived from this requires that the basic functions of the vehicle, in particular at the execution level, continue to be ensured at least with functional limitations. For the control of the brakes in the autonomous driving mode this means that when any fault occurs the brake system can continue to operate under electronic controls so that vehicle movement dynamics control functions such as, for example, ABS, traction control system, ESP, can also continue to be implemented, albeit possibly with limitations.

Although doubling of all the components of the brake system for forming a redundancy system is expedient in respect of maintaining the functionality even when a fault occurs, it is not acceptable in terms of costs, installation space and weight, in particular in series production.

SUMMARY OF THE INVENTION

An object of the present invention is thus to expand a brake system which is usually controlled electronically and which even in the case of a fault can continue to be braked the vehicle under electronic control.

This object may be achieved by the subject matters of the independent claims. Advantageous developments are the subject matter of the dependent claims.

According to the invention, a brake system is provided which is configured to acquire at least one status variable for controlling the brake system and which is suitable for a vehicle, the brake system having:

- a primary control means which is configured to control the brake system by at least one actuator and taking into account the at least one status variable,
- a redundancy control means which is configured to control the brake system by part of the at least one actuator and taking into account part of the at least one status variable, wherein
- the brake system is configured such that, when at least one switch-over condition is satisfied, the control of the brake system is no longer carried out exclusively by the primary control means but rather at least partially by the redundancy control means.

"By part of the at least one actuator" means that all the actuators which are actuated by the primary control means are not necessarily also actuated by the redundancy control means. It is also possible for fewer to be actuated. It is also possible to provide actuators which are actuated exclusively by the redundancy control means.

"Taking into account part of the at least one status variable" means that all the status variables which are taken into account by the primary control means are not necessarily also taken into account by the redundancy control means. It is also possible for fewer to be taken into account. It is also possible to provide status variables which are taken into account exclusively by the redundancy control means.

The brake system may be configured such that, when at least one switch-over condition is satisfied, the control of the brake system no longer occurs exclusively by the primary control means but rather at least partially by the redundancy control means. In one exemplary embodiment of the invention the control of the brake system occurs exclusively by the redundancy control means here. In other embodiments of the invention, sub-functions continue to be performed by the primary control means, wherein the redundancy control means may perform supplementary functions for the purpose of control.

In addition it is conceivable to design the brake system in such a way that a plurality of switch-over stages are provided. For example, the switching over therefore occurs in a first stage for the partial control by the redundancy system when a first switch-over condition is satisfied, wherein in a second stage a complete changeover to the redundancy system occurs as soon as control is no longer possible by the primary system.

The brake system may have at least one actuator which is configured to influence a brake pressure for actuating at least one brake of the brake system, and/or at least one sensing means which is configured to acquire at least one status variable for controlling the brake system.

The brake system may be embodied as an electropneumatic brake system and/or is configured for autonomous operation.

An electropneumatic brake system is basically known. It is to be understood essentially as a brake system which generates the brake pressures pneumatically, wherein the brake system is configured to carry out the generation of these brake pressures under open-loop or closed-loop electronic control. For this purpose, for example, the primary control means or else the redundancy control means are provided, the means being configured to communicate control commands to components of the brake system, which may be to actuators, in order thereby to influence the brake pressure.

The primary control means may be embodied as an electronic control device.

The redundancy control means may be embodied as an electronic control device.

The primary control means and/or the redundancy control means are/may be integrated into a component of the brake system. This component may be an actuator or some other electropneumatic component of the brake system.

The primary control means and/or the redundancy control means are/is also may be embodied as part of a control means which is present in the brake system. In addition, the control means may be embodied as an electronic control device.

The brake system may be configured to be controlled electronically by the primary control means and/or the redundancy control means.

The at least one actuator may be a pressure generator which is configured to generate the brake pressure, in particular from a pressure accumulator, and/or a pressure controller which is configured to perform open-loop and/or closed-loop control of the brake pressure.

The pressure generator may have for this purpose a connection to a pressure accumulator, via which connection it is supplied with a pressure medium, in particular compressed air, from which the pressure generator generates the brake pressure. The pressure controller may be embodied as a valve, particularly as a solenoid valve, and in addition is configured to control the brake pressure of the pressure generator, so that it is made possible for the brake pressure to be reduced by the pressure controller.

The at least one sensing means may have a sensor which is configured to acquire the at least one status variable and/or which has an interface which is configured to obtain the at least one status variable from a vehicle network.

The at least one status variable may be, in particular, a wheel speed, a velocity, an acceleration, a wheel torque or a brake pressure. The status variable is particularly suitable for determining a driving state, in particular with respect to vehicle movement dynamics stability. This can occur using further status variables.

The driving state may be described by two status variables such as the side slip angle and yaw rate or longitudinal and lateral acceleration of the vehicle.

The primary control means may be configured to be supplied with energy by a primary supply source, and the redundancy control means may be configured to be supplied with energy by a redundancy supply source.

The primary and redundancy supply sources may be embodied as an on-board electrical power system of the vehicle.

A switch-over condition may be a failure of the primary supply source and/or an at least partial failure of the primary control means. Therefore, when a fault which at least partially prevents the brake system from being controlled by the primary control means occurs, the control of the brake system may be partially, particularly completely, assumed by the redundancy control means.

The brake system may be configured to be at least partially controlled electronically by the redundancy control means. This means that the redundancy control means does not necessarily have to obtain electronic access to all the components of the brake system to which the primary control means has electronic access.

The primary control means and/or the redundancy control means are/may be configured to obtain the at least one status variable.

"Electronic controlled" means here that control signals which were previously obtained electronically, for example by a software algorithm, in particular on the basis of the at least one status variable, are transmitted to components of the brake system. The control signals may be embodied in different ways here. The control signals may be embodied electrically.

The brake system may have an operating level, a so-called "first redundancy level" in which at least individual components of the brake system can no longer be actuated electronically. The control, in particular the transmission of control signals to these components, is carried out here in a different way, which may be by pneumatically embodied control signals.

In this context, the redundancy control means may be configured to control electronically brake pressures at individual wheels or at least individual axes of the vehicle and/or of a trailer. For this purpose, the redundancy control means may have electronic control connections to at least some of the corresponding pressure controllers and/or corresponding pressure generators, which are also actuated electronically by the primary control means. In addition, the redundancy control means may be configured also to be supplied electronically with status variables of the brake system via the same sensing means. Therefore, it is also advantageously possible to achieve electronic control of the brake system in the first redundancy level, as result of which specific stabilization functions can also be implemented. The embodiment of the first redundancy level of the brake system with a further control means has the advantage that actuators and sensing means do not have to be made available separately for the first redundancy level. Instead, the actuators and sensing means which are present in any case can be used.

The brake system may have at least one control device which is configured to generate a non-electronic brake input for the brake system, in order to trigger braking by the brake system, wherein the control device is configured to be controlled, in particular electronically, by the redundancy control means.

Through the control device, the brake system is also able to receive in the first redundancy level brake inputs which are generated in the autonomous driving mode. The brake inputs may be embodied as pneumatic signals, wherein in order to generate these signals the control device has a connection to the pressure accumulator. In this way, the control of the brake system in an autonomous driving mode can also be made possible in the first redundancy level.

The brake system may have a foot brake module which is configured to produce, from a brake input, at least a control signal for generating a brake pressure, wherein the at least one control signal is embodied electronically and/or pneumatically, wherein the foot brake module and the module are embodied in one piece or separately.

A brake input can be transmitted electronically to the foot brake module here. In addition, the brake input can also be embodied non-electronically, which may be pneumatically, in particular in the first redundancy level.

The brake input can be generated here in the autonomous mode by the primary control means or the redundancy control means using the control device or can be generated by a driver, wherein a position of a brake pedal may be sensed electronically and/or is received by the foot brake module by mechanical engagement of the brake pedal in the foot brake module.

In a further embodiment of the invention, a method for operating a brake system is provided, which has the following steps:

testing whether a switch-over condition is satisfied;

changing over the control of the brake system from the primary control means at least partially to the redundancy control means when a switch-over condition is satisfied.

When at least one switch-over condition is satisfied, the control of the brake system is no longer carried out exclusively by the primary control means but rather at least partially by the redundancy control means. In one exemplary embodiment of the invention, the control of the brake system is carried out exclusively by the redundancy control means. In other embodiments of the invention, sub-functions continue to be performed by the primary control means, wherein the redundancy control means may perform supplementary functions for the purpose of control.

The method may comprise a step in which a transfer of the information which is essential for the operation of the brake system to the redundancy control means is carried out, wherein the transfer occurs during the at least partial changeover from the primary control means to the redundancy control means, or already occurs before this.

The method may comprise one of the following steps:

acquiring at least one status variable for controlling the brake system;

determining the driving state, in particular with respect to vehicle movement dynamics stability;

generating brake pressure for actuating at least one brake as a function of the driving state;

determining information which is essential for the operation of the brake system.

The information which is essential for the operation of the brake system may contain in particular information about:

brake pressures which are present, at least one status variable, in particular a wheel speed, a velocity, an acceleration, a wheel torque, a brake pressure or some other suitable variable, for determining the driving state, in particular with respect to vehicle movement dynamics stability, running monitoring functions, in particular for monitoring the at least one actuator and/or the at least one sensing means, running control functions, in particular for performing open-loop and/or closed-loop control of a wheel slip and/or of vehicle movement dynamics stability of the vehicle, actuated actuators, in particular fault states which are present, in particular of the at least one actuator and/or of the at least one sensor.

A switch-over condition may be a failure of the primary supply source and/or an at least partial failure of the primary control means.

In a further embodiment of the invention, a computer program product having a program code which is stored on a machine-readable carrier and which is configured, when run on a data processing device, to cause the data processing device to execute the method according to the invention as described above, is provided.

The data processing device may be embodied here as a primary control means and/or redundancy control means, which makes it possible to configure the device to control the brake system.

Exemplary embodiments of the invention are described below by the appended drawings.

DETAILED DESCRIPTION

Figure 1:
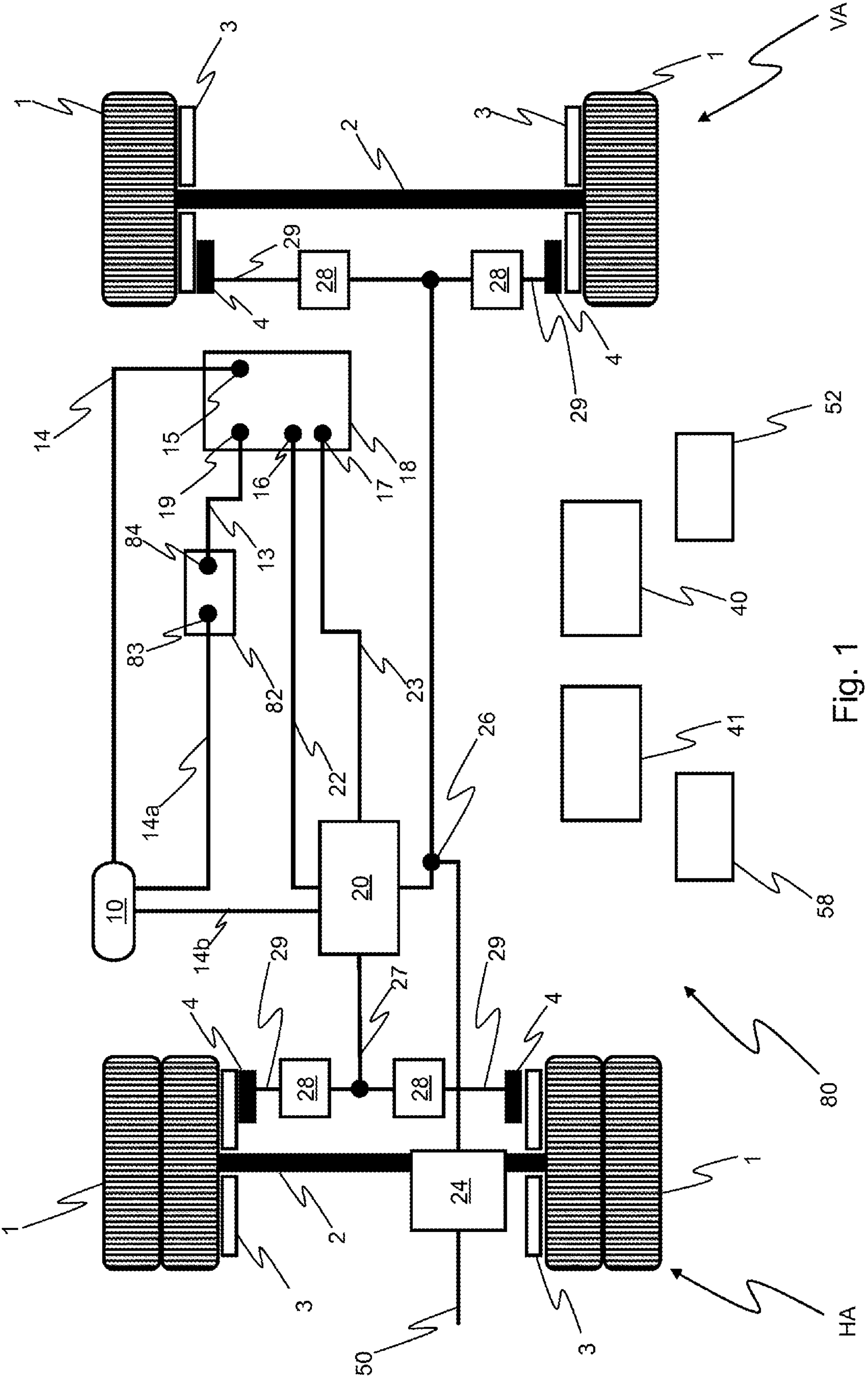
FIG. 1 shows an embodiment of a brake system according to the invention.
Figure 2:
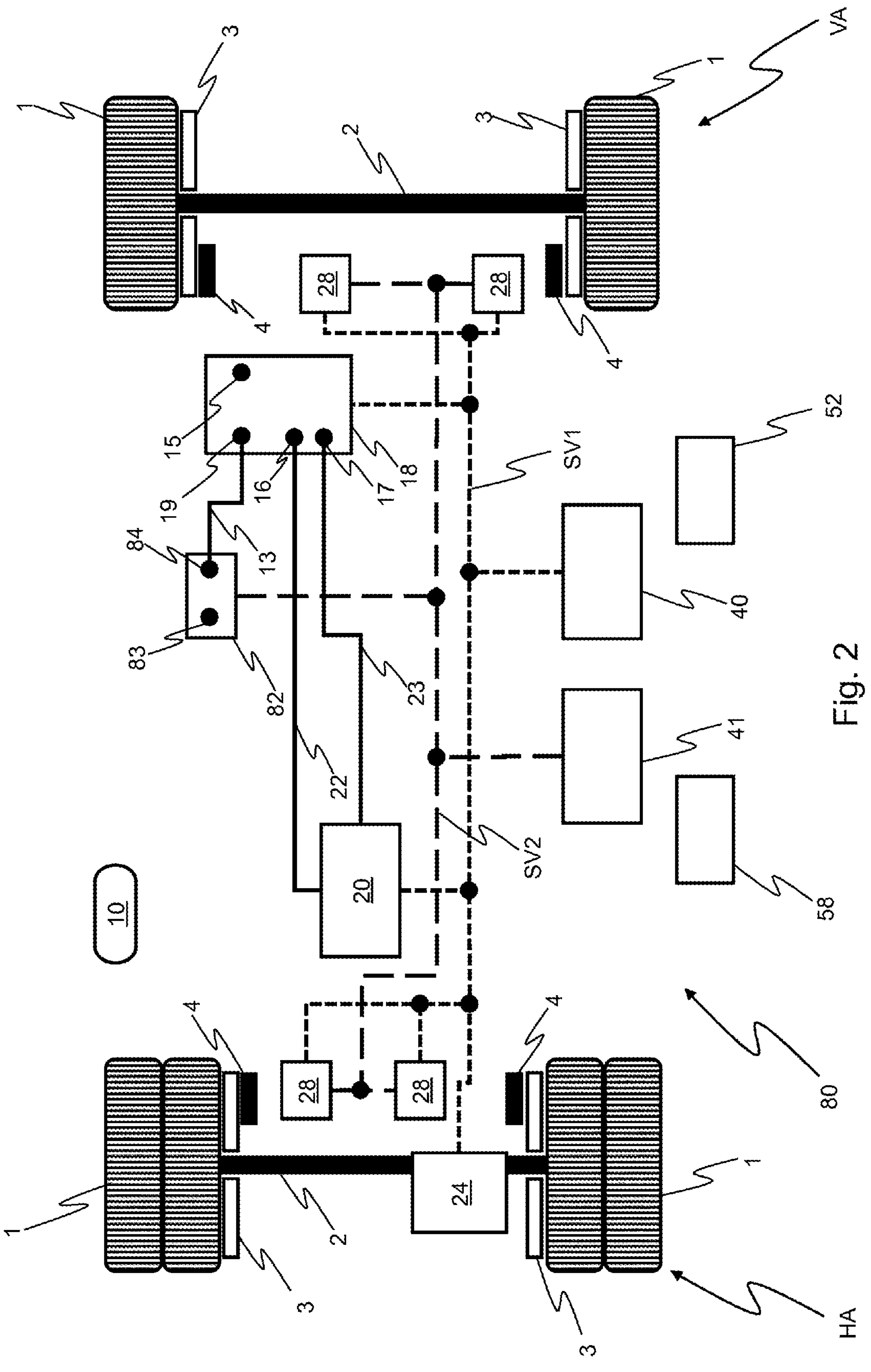
FIG. 2 shows control connections of the brake system from FIG. 1.

FIG. 1 shows an embodiment of a brake system 80 according to the invention, and FIG. 2 shows control connections of the system 80 from FIG. 1. The following description of the brake system 80 relates to both drawings here.

A front axle VA and a rear axle HA are shown, each having wheels 1 which are attached to an axle 2 in a rotatable manner. The wheels 1 are each assigned a brake device which is embodied as a friction brake in the example shown. For this purpose, a brake disk 3, which is configured to enter into frictional contact with a friction partner, in this case a brake lining 4, is provided on each wheel 1. The brake disk 3 is connected in a co-rotational manner to the respective wheel 1 and therefore rotates along with the wheel 1 during travel.

In order to execute a braking operation, the respective brake lining 4 is placed in contact with the corresponding brake disk 3 by applied brake pressure, as result of which a frictional force occurs at the brake disk 3, which force results in a braking torque which counteracts the rotational movement of the brake disk 3 and in particular of the wheel 1.

For reasons of clarity, further components of the vehicle and, in particular, of the axle design or of the design of the brakes have been omitted from this illustration.

Furthermore, such a brake design and vehicle design are not to be considered as being restrictive for the subject matter of the invention. The designs merely serve as an example for clarifying the method of operation of the subject matter according to the invention. Instead, alternative design possibilities of a brake are also conceivable, such as for example of a drum brake instead of the disk brake shown. Further embodiments of a vehicle are also conceivable. For example, more than one front axle VA or rear axle HA, that is to say in total more than two axles, could therefore be provided.

In addition, rotational speed sensors (not shown) are provided on the wheels 1 in order to sense rotational speeds of individual wheels 1.

The brake system 80 will now be described below. The system has a pressure accumulator 10 which supplies different components 18, 20, 82 of the brake system 80 with compressed air via supply lines 14, 14*a*, 14*b*.

One component constitutes in this context a foot brake module 18 which is connected to the supply line 14 via a supply inlet 15. The foot brake module 18 is supplied with compressed air via the inlet. The foot brake module 18 also has a control inlet 19 via which the foot brake module 18 can receive pneumatic brake inputs. Furthermore, the foot brake module 18 has two control outlets 16, 17, via which the foot brake module 18 can emit pneumatic control signals. In addition, the foot brake module 18 has an interface (not shown) with a driver via which it can receive brake inputs, which are input, for example, via a brake pedal. The foot brake module 18 is configured to receive electronically the brake inputs of the driver or brake inputs which are produced during the autonomous driving mode, and to transmit them to further components of the brake system 80. The foot brake module 18 is also configured such that, if the electronic acquisition of brake inputs is not possible, it can receive these inputs pneumatically. For this purpose, direct mechanical engagement (not shown) of the brake pedal into the foot brake module 18 is provided, as result of which a driver can generate, within the foot brake module 18, a pneumatic pressure which corresponds to a brake input. In the autonomous driving mode, a corresponding pneumatic brake input can be received via the control inlet 19. The foot brake module 18 is also configured to generate pneumatic control signals from these pneumatic brake inputs and to make the signals available via the control outlets 16, 17.

The brake system 80 also has a control device 82, which is supplied with compressed air from the pressure accumulator 10 via a supply inlet 83 by a supply line 14*a*. The control device 82 is configured to generate a pneumatic brake input, which can be used to trigger braking in the autonomous driving mode. Therefore, the control device 82 has a control outlet 84, wherein the latter is connected to the control inlet 19 of the foot brake module 18 via a control line 13. The foot brake module 18 can therefore receive pneumatic brake inputs of the control device 82. The control device 82 is also configured to generate the pneumatic brake inputs from an electronic control signal.

The control device 82 and the foot brake module 18 can also be embodied integrally in another embodiment (not shown).

Furthermore, the brake system 80 has a pressure generator 20. The latter is supplied with compressed air from the pressure accumulator 10 via a supply line 14*b*. The pressure generator 20 is configured to generate pneumatic brake pressure for the front axle VA, the rear axle HA and a trailer. The pressure generator 20 is configured to generate the brake pressure here by an electronic control signal and alternatively by pneumatic control signals. The pressure generator 20 is connected to the control outlet 16 of the foot brake module 18 via a control line 22, in order to receive pneumatic control signals for the front axle VA and a trailer, and the pressure generator 20 is connected to the control outlet 17 of the foot brake module 18 via a control line 23, in order to receive pneumatic control signals for the rear axle HA. In order to transmit the pneumatic brake pressures to the front axle VA and the trailer, the pressure generator 20 is connected to a line 26, and in order to transmit the pneumatic brake pressures to the rear axle HA the pressure generator 20 is connected to a line 27.

Pressure controllers 28, which are embodied, for example, as solenoid valves, are provided on the front axle VA and rear axle HA on a wheel-specific basis. These pressure controllers 28 are configured to apply the brake pressure, transmitted to them via the lines 26, 27, on the basis of an electronically generated control signal, so that a wheel-specific brake pressure is present in the individual brake lines 29 which transmit the brake pressure to the brakes.

In addition, a trailer module 24 is shown. This is essentially likewise a pressure controller 24 which is configured to control a pneumatic brake pressure, which it receives the line 26, on the basis of an electronic control signal and to transmit it to a brake line 50 leading to a trailer.

Moreover, a primary control means 40 and a redundancy control means 41, which can be provided, for example, as separate electronic control units, are shown. The primary control means 40 is supplied with electrical energy here via a primary supply source 52, and the redundancy control means 41 is supplied with electrical energy via a redundancy supply source 58. The corresponding lines have not been illustrated.

The primary control means 40 is connected by a primary control connection SV1, shown as a fine dashed line in FIG. 2. The primary control connection SV1 is embodied as an electronic control connection via which the primary control means 40 is able to control a plurality of components of the brake system 80 electronically. As shown in FIG. 2, the primary control means 40 is connected to the foot brake module 18, the pressure generator 20 and the pressure controllers 24, 28. The primary control means 40 is also connected via the primary control connection SV1 to the rotational speed sensors (not shown) and/or further sensors (not shown) such as pressure sensors for sensing the brake pressure so that rotational speed signals of the wheels 1 or brake pressures which are present at the brakes can be transmitted to the primary control means 40.

The redundancy control means 41 is connected by a redundancy control connection SV2, which is shown as a roughly dashed line in FIG. 2. The redundancy control connection SV2 is embodied as an electronic control connection, via which the redundancy control means 41 is able to control a plurality of components of the brake system 80 electronically. As shown in FIG. 2, the redundancy control means 41 is connected in this way to the pressure controllers 28 and the control device 82. Via the redundancy control connection SV2, the redundancy control means 41 is also connected to the rotational speed sensors (not shown) and/or further sensors (not shown) such as pressure sensors for sensing the brake pressure, so that rotational speed signals of the wheels 1 or brake pressures which are present at the wheels can be transmitted to the redundancy control means 41.

The primary control connection SV1 and the redundancy control connection SV2 are therefore also configured to receive data and measurement variables.

In addition, in a further embodiment (not shown) a control connection and/or data connection is provided between the primary control means 40 and the redundancy control means 41, so that control signals, measurement variables and further data items and information can be exchanged between the two means 40 and 41. This connection can be provided, for example, as a separate connection, or implemented in the vehicle by infrastructure which is already present, such as for example a CAN-BUS. This permits in particular the brake system 80 to operate partially through the primary control means 40 and partially through the redundancy control means 41.

The brake system 80 which is shown has a plurality of operating levels (normal operation mode, first and second redundancy levels) in which it can be operated. These are described below with reference to FIGS. 1 and 2.

Normal Operation Mode

In the normal operation mode, the brake system 80 is controlled by the primary control means 40 which actuates the components described above via the primary control connection SV1. A brake input for the brake system 80, which input can be generated by a driver by a brake pedal or is generated in an automated manner in the autonomous mode, is received electronically by the foot brake module 18 and transmitted to the primary control means 40. The primary control means 40 determines, from the brake input, corresponding brake pressures for the front axle VA, the rear axle HA and a trailer. In order to generate these pressures, the pressure generator 20 is correspondingly actuated by the primary control means 40 via the primary control connection SV1. The pressure generator 20 generates the corresponding brake pressures from the pressure which it receives from the pressure accumulator 10 via the supply line 14*b*. The brake pressures are transmitted via the lines 26, 27 to the front axle VA, the rear axle HA and the trailer. The brake pressure is controlled on a wheel-specific basis by the pressure controllers 28 at the front axle VA and rear axle HA. The actuation of these pressure controllers 28 is carried out here electronically by the primary control means 40 via the primary control connection SV1. The primary control means 40 utilizes information of the brake system, such as for example the wheel speeds, which it receives, for example, via the primary control connection SV1, to control the brake pressures. In addition, the primary control means 40 also controls the pressure controller 24 electronically, in order to make available a brake pressure to a trailer via the brake line 50 and in order to control the brake pressure. The wheel-specific control of the brake pressures by the pressure controllers 28 makes it possible to provide stabilization functions by the brake system 80, the functions being embodied in such a way that the vehicle can, for example, be stabilized in terms of vehicle movement dynamics or can be decelerated with the shortest possible braking distance.

First Redundancy Level

If a fault which prevents control by the primary control means 40 or at least limits it occurs within the brake system 80, the control of the brake system 80 is then carried out at least partially by the redundancy control means 41. Such a fault can be characterized, for example, by an at least partial failure of the primary control means 40 or a failure of the primary supply source 52. The redundancy control means 41 then does not have a control connection to the foot brake module 18, but it can actuate the control device 82 via the redundancy control connection SV2 and thereby transmit a pneumatic brake input to the control inlet 19 of the foot brake module 18. The brake system 80 is therefore able, even in a fault situation in which electronic control by the primary control means 40 is not possible or is possible only to a limited degree, to generate a brake input for the brake system 80 as result of which an autonomous operating mode is also made possible now. In addition, the foot brake module 18 can receive brake inputs of a driver by mechanical engagement. The foot brake module 18 converts all the brake inputs into pneumatic control signals and transmits them via the control lines 22, 23 to the pressure generator 20, which, like the foot brake module 18, is not connected to the redundancy control means 41 via the redundancy control connection SV2. The received pneumatic control signals are converted by the pressure generator 20 into brake pressures which the pressure generator 20 transmits to the lines 26, 27 for the front axle VA, the rear axle HA and the trailer. At the front axle VA and rear axle HA, the brake pressure is controlled by the pressure controllers 28 on a wheel-specific basis. These pressure controllers 28 are actuated electronically by the redundancy control means 41 via the redundancy control connection SV2. For the control of the brake pressures, the redundancy control means 41 utilizes information of the brake system, such as for example the wheel speeds, the vehicle accelerations or brake pressures which are present, and which it receives from corresponding sensors or interfaces, for example via redundancy control connection SV2. The brake pressure, which is transmitted to the trailer in this embodiment, is transmitted in an uncontrolled manner, since the pressure controller 24 cannot be controlled electronically through the redundancy control connection SV2. Through the wheel-specific control of the brake pressures by the pressure controllers 28 it is possible to provide stabilization functions even in the first redundancy level by the brake system 80, the stabilization functions being embodied in such a way that the vehicle can, for example, be stabilized in terms of vehicle movement dynamics, or decelerated with a braking distance which is as short as possible. In addition, further embodiments in which pressure control for the trailer is, for example, also provided, are also conceivable.

Second Redundancy Level

The second redundancy level is finally achieved through the occurrence of a further fault. The brake system 80 is then also no longer able to be controlled by the redundancy control means 41 or partially by the primary control means 40 and partially by the redundancy control means 41, for example because the redundancy control means 41 or the redundancy supply source 58 has failed. This results in all the pressure controllers 24, 28 no longer being able to be actuated electronically. They switch now, if this has not already happened in any case in the first redundancy level, into a transmission position so that a brake pressure is transmitted in an uncontrolled manner to the wheels 1 or to a trailer by a brake line 50. In this level, an autonomous driving mode is no longer possible, since neither the primary control means 40 nor the redundancy control means 41 can produce brake inputs in an automated manner as described above. Brake inputs of a driver can, however, still be received by mechanical engagement by the foot brake module 18. This means that pneumatic control signals are generated by the foot brake module 18 and by brake pressures using the pressure generator 20 in the same way as in the first redundancy level. However, these brake pressures are now transmitted in an uncontrolled manner to the front axle VA, rear axle HA and trailer, since, as described above, control is no longer possible. Therefore, in the second redundancy level wheel-specific control operations of the brake pressure are no longer possible, as result of which vehicle movement dynamics stabilization operations can no longer be implemented either. However, it continues to be possible to convert a brake input into vehicle deceleration and to stop the vehicle, as result of which the second redundancy level also contributes to the safety of the driving mode.

The brake system 80 which is shown here is not to be understood as limiting the subject matter of the invention. Instead, further brake systems are conceivable which also represent subject matters according to the invention. Therefore, for example instead of a single brake generator 20 it is also possible to provide a plurality of brake generators which make available brake pressure for just part of the brake system 80, for example only for the rear axle HA.

However, the essential inventive concept remains the fact that an existing electronic brake system is expanded in such a way that in the first redundancy level it continues to be able to be controlled electronically. In this context, as few components as possible are added for the formation of the first redundancy level, wherein as many components as possible, such as pressure controller 28 are controlled electronically in the normal operation mode and in the first redundancy level. In this context, these components are not provided separately for each operating level. Instead, each operating level accesses the same component, such as a pressure controller 28 or sensors.

In a further embodiment (not shown) in which a control connection and/or data connection is provided between the primary control means 40 and the redundancy control means 41, there is provision that the primary control means 40 and the redundancy control means 41 are not connected to all the rotational speed sensors and/or further sensors such as pressure sensors for sensing the brake pressure. Here, the primary control means 40 and the redundancy control means 41 are respectively only connected to some of the rotational speed sensors and/or further sensors, wherein variables which are acquired by the sensors are exchanged between the primary control means 40 and the redundancy control means 41. If, for example, it is no longer possible for the brake system 80 to be controlled by the primary control means 40, since the latter has failed, the redundancy control means 41 performs the control. However, the variables which are acquired and which the primary control means 40 had acquired are no longer available now. Therefore, the variables which are acquired by the sensors and which are transmitted to the redundancy control means 41 are selected in such a way that electronic control of the brake system 80 is also still possible here. For example, wheel speeds and brake pressures of one respective wheel 1 and the corresponding brake of an axle VA, HA of the vehicle are made available, in order to be able to perform axle-specific control of the brake pressure at least on the basis of these variables.

Figure 4:
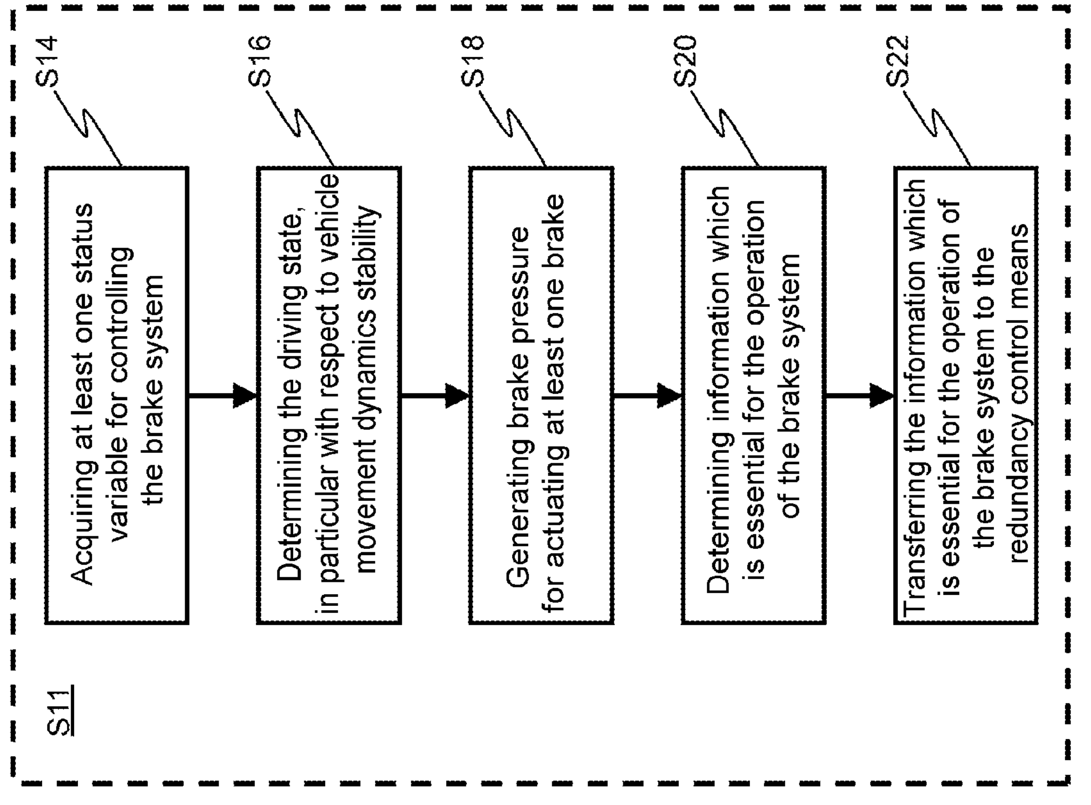
FIG. 4 shows a detailed flow diagram of the step S11 from FIG. 3.
Figure 3:
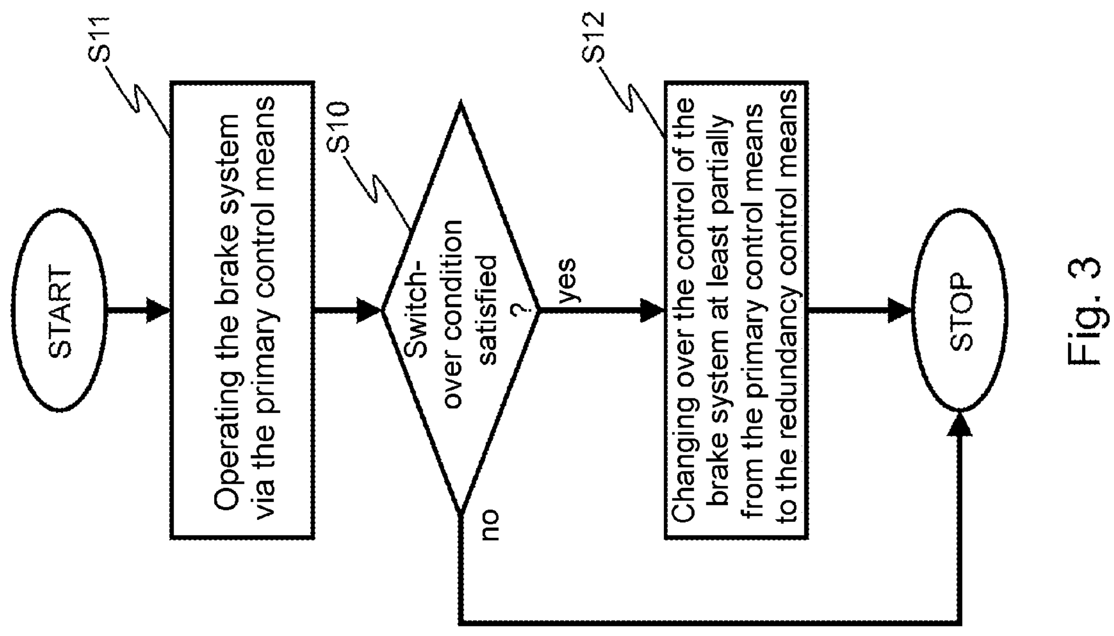
FIG. 3 shows a flow diagram of a method according to the invention.

FIG. 3 shows a flow diagram of a method according to the invention, and FIG. 4 shows a detailed flow diagram of the step S11 from FIG. 3. The following description of the method relates to both drawings here.

After the start of the method, in a step S11 the brake system 80 is operated using the primary control means 40 from FIGS. 1 and 2.

In addition, within one pass through the method, step S10 is carried out in which testing takes place as to whether a switch-over condition which would bring about a change-over S12 of the control of the brake system at least partially from the primary control means to the redundancy control means has been satisfied. A switch-over condition is given here, for example, by an at least partial failure of the primary control means or by a failure of the primary supply source, so that electronic control of the brake system by the primary control means is no longer possible. The redundancy control means can then continue the electronic control of the brake system via the control connection SV2 shown in FIG. 2.

For example, at least one step S14, S16, S18, S20, S22 from FIG. 4 is carried out in step S11, the steps being characterized in particular as follows:

In step S14, the acquisition of at least one status variable for controlling the brake system is carried out. Status variables are to be understood here as, in particular, variables which permit a general conclusion about the current operating state of the brake system or of the vehicle. In particular, they are at least one brake pressure which is present, a vehicle acceleration and/or vehicle velocity, at least one wheel speed and the like. In addition, brake inputs of a driver or brake inputs which have been generated automatically in the autonomous driving mode, such as for example steering angle, brake inputs and the like, are acquired. The status variables are suitable here for permitting calculation of a required brake pressure, which may be on a wheel-specific basis.

In step S16, the driving state of the vehicle is determined, in particular with respect to vehicle movement dynamics stability. The status variables which have been determined in step S14 and/or further variables which are received, for example, via a vehicle BUS may be used for this purpose. The driving state describes here the movement of the vehicle at least on a flat. It is therefore described, for example, by two status variables such as side slip angle and yaw rate or longitudinal and lateral acceleration of the vehicle. Assessment in respect of vehicle movement dynamics stability can be carried out, for example, with a comparison of the values of the driving state with comparison values, for example from a mathematical vehicle model which is operated in parallel therewith. If the driving state deviates here too far from the behavior of the vehicle model, it is possible to infer a driving state which is unstable in terms of vehicle movement dynamics. Other assessment methods are known to a person skilled in the art from the prior art.

In step S18 there is the generation of brake pressure which serves to actuate at least one brake of the vehicle. As result, a braking torque is applied to the corresponding wheel at at least the one brake. During the generation of the brake pressure, in particular the driving state which is determined in step S16 and/or the status variables which are acquired in step S14 are taken into account, so that vehicle movement dynamics stabilization of the vehicle can be carried out by selective actuation of individual brakes.

In step S20, the determination of information which is essential for the operation of the brake system occurs. This includes not only the status variables acquired in step S14 and/or the driving state determined in step S16 but also further information such as, for example, which monitoring and diagnostic functions are currently active for controlling the brake system, whether and which control functions for the brake pressure, for example anti-lock brake system, traction control system etc. are currently active, which components, for example pressure controllers and/or pressure generators of the brake system are currently actuated or which fault states, for example of individual components of the brake system, are currently present.

In step S22, the transfer of this information which is essential for the operation to the redundancy control means occurs. This is therefore able to perform the control of the brake system at any time. In this context, the step S22 can be executed continuously so that primary control means and redundancy control means always have the same information, or step S22 does not occur until the changeover of the control according to step S12 occurs.

The specified method steps do not necessarily have to be processed in the sequence shown. Instead, further sequences of the method according to the invention are presentable in which the sequence of individual steps is interchanged or else individual steps are omitted. The method according to the invention is additionally configured to be processed continuously while the vehicle is operating, wherein individual steps, such as for example the steps S14, S16 and S20, can also be processed in parallel.

When the method is carried out or generally when the brake system 80 is operating it is also irrelevant whether the vehicle is currently in the autonomous driving mode or whether the vehicle is controlled by a driver. The brake system 80 in FIGS. 1 and 2 is embodied in such a way that it can both implement brake inputs by the brake pedal as well as brake inputs which result from the autonomous driving mode. In this context, the implementation in the primary control level occurs electronically by electronic acquisition of a brake input by the foot brake module 18 and by electronic actuation of the pressure generator 20 as well as of the pressure controllers 24, 28 by the primary control means 40. In the first redundancy level, the control occurs partially electronically and partially pneumatically, wherein the electronic control is carried out by the redundancy control means 41. Brake inputs of a driver can be received via the foot brake module 18, and at the same time a pneumatic brake input can also be transferred from the control device 82 to the foot brake module 18 in the autonomous driving mode. The foot brake module 18, which is now no longer actuated electronically, generates, from these brake inputs, pneumatic control signals which are transferred to the pressure generator 20, which is configured to generate the brake pressures using the pneumatic control signals. In the embodiment of the brake system 80 which is shown, finally a pressure controller 28 is controlled electronically by the redundancy control means 41, so that electronically controlled wheel-specific adjustment of the brake pressure is also possible here at least in the tractor vehicle.

The embodiments shown do not act in a limiting manner on the subject matter of the invention. Instead, further embodiments are also conceivable which, however, do not place the principle according to the invention in question. For example, a brake system according to the invention can also have a plurality of pressure generators which generate brake pressure, for example, only for sections of the brake system such as individual axles or a trailer. It is also possible to provide combinations of pressure generators and pressure controllers which, for example, not only generate but also simultaneously apply a brake pressure. These combinations can also, for example, supply only sections of the brake system with brake pressure.

Moreover, the vehicle can be configured to tow more than just one trailer. In this context, the brake system 80 can be configured to influence the brake pressure for each trailer individually or for all trailers jointly. The brake system 80 then has, for example, a trailer module 24 which is configured to influence the brake pressure of the trailers.

The embodiments explained here do not limit the subject matter of the invention but rather merely show exemplary embodiments of the invention. Moreover, further embodiments are conceivable which can be obtained by combining individual features of different embodiments.

THE LIST OF REFERENCE SYMBOLS IS AS FOLLOWS

1 Wheel
2 Axle
3 Brake disk
4 Brake lining
10 Pressure accumulator (compressed air source)
13 Control line
14 Supply line
14*a* Supply line
14*b* Supply line
15 Supply inlet (foot brake module)
16 Control outlet (foot brake module, interface for VA and trailer)
17 Control outlet (foot brake module, interface for HA)
18 Foot brake module
19 Control inlet foot brake module
20 Pressure generator
22 Control line (for VA and trailer module 24)
23 Control line (for HA)
24 Pressure controller (trailer module)
26 Line
27 Line
28 Pressure controller (pressure control valve)
29 Brake line
40 Primary control means (control unit)
41 Redundancy control means (control unit)
50 Brake line (to the trailer)
50 Primary supply source
58 Redundancy supply source
80 Brake system
82 Control device
83 Supply inlet (control device)
84 Control outlet (control device)
S10 Testing whether a switch-over condition is satisfied
S11 Operating the brake system via the primary control means
S12 Changing over the control of the brake system at least partially from the primary control means to the redundancy control means when a switch-over condition is satisfied
S14 Acquiring at least one status variable for controlling the brake system
S16 Determining the driving state, in particular with respect to vehicle movement dynamics stability
S18 Generating brake pressure for actuating at least one brake as a function of the driving state
S20 Determining information which is essential for the operation of the brake system
S22 Transferring the information which is essential for the operation of the brake system to the redundancy control means
SV1 (Electronic) primary control connection
SV2 (Electronic) redundancy control connection
HA Rear axle
VA Front axle

The invention claimed is:

1. A brake system for a vehicle for acquiring at least one status variable for controlling the brake system, comprising:
a primary control means for controlling the brake system by at least one actuator and taking into account the at least one status variable; and
a redundancy control means for controlling the brake system by part of the at least one actuator and taking into account part of the at least one status variable,
wherein the brake system is configured such that,
when at least one switch-over condition is satisfied,
the brake system is no longer controlled exclusively by the primary control means, and
the brake system is controlled partially by the primary control means and controlled partially by the redundancy control means.

2. The brake system of claim 1, further comprising:
the at least one actuator to influence a brake pressure for actuating at least one brake of the brake system; and/or
at least one sensing means for acquiring the at least one status variable for controlling the brake system.

3. The brake system of claim 1, wherein the brake system includes an electropneumatic brake system, and/or is configured for autonomous operation, and/or wherein the brake system is controlled electronically by the primary control means and/or the redundancy control means.

4. The brake system of claim 2, wherein the at least one actuator includes a pressure generator for generating the brake pressure, from a pressure accumulator, and/or includes a pressure controller to perform open-loop and/or closed-loop control of the brake pressure.

5. The brake system of claim 2, wherein the at least one sensing means has a sensor for acquiring the at least one status variable and/or which has an interface for obtaining the at least one status variable from a vehicle network.

6. The brake system of claim 1, wherein the at least one status variable includes a wheel speed, a velocity, an acceleration, a wheel torque, a brake pressure or another variable, for determining a driving state, with respect to vehicle movement dynamics stability.

7. The brake system of claim 1, wherein the primary control means is configured to be supplied with energy by a primary supply source, and the redundancy control means is configured to be supplied with energy by a redundancy supply source.

8. The brake system of claim 1, wherein a switch-over condition is a failure of a primary supply source and/or an at least partial failure of the primary control means.

9. The brake system of claim 1, wherein the brake system is configured to be at least partially controlled electronically by the redundancy control means.

10. The brake system of claim 1, further comprising:
at least one control device for generating a non-electronic brake input for the brake system, so as to trigger braking by the brake system,
wherein the control device is configured to be controlled, electronically, by the redundancy control means.

11. The brake system of claim 10, further comprising:
a foot brake module to produce, from a brake input, at least a control signal for generating a brake pressure, wherein the brake signal is embodied either electronically or pneumatically,
wherein the foot brake module and the control device are in one piece or separate.

12. A method for operating a brake system for acquiring at least one status variable for controlling the brake system, the method comprising:

testing whether a switch-over condition is satisfied, wherein the brake system includes:

a primary control means for controlling the brake system by at least one actuator and taking into account the at least one status variable; and a redundancy control means for controlling the brake system by part of the at least one actuator and taking into account part of the at least one status variable;

wherein the brake system is configured such that, when at least one switch-over condition is satisfied, the brake system is no longer controlled exclusively by the primary control means and is at least partially controlled by the redundancy control means; and changing over the control of the brake system from the primary control means at least partially to the redundancy control means when a switch-over condition is satisfied.

13. The method of claim 12, further comprising:

acquiring at least one status variable for controlling the brake system;

determining the driving state, with respect to vehicle movement dynamics stability;

generating brake pressure for actuating at least one brake as a function of the driving state;

determining information which is essential for the operation of the brake system; and transferring the information which is essential for the operation of the brake system to the redundancy control means, wherein the transfer occurs during the at least partial changeover from the primary control means to the redundancy control means, or occurs before this.

14. The method of claim 13, wherein the information which is essential for the operation of the brake system contains in particular information about: (i) brake pressures which are present, and/or (ii) at least one status variable, in particular a wheel speed, a velocity, an acceleration, a wheel torque, a brake pressure or some other suitable variable, for determining the driving state, with respect to vehicle movement dynamics stability, (iii) running monitoring functions, for monitoring the at least one actuator and/or the at least one sensing means, (iv) running control functions, for performing open-loop and/or closed-loop control of a wheel slip and/or of vehicle movement dynamics stability of the vehicle, (v) actuated actuators, in particular fault states which are present in the at least one actuator and/or the at least one sensor.

15. The method of claim 12, wherein a switch-over condition is a failure of the primary supply source and/or an at least partial failure of the primary control means.

16. A non-transitory computer readable medium having a computer program, which is executable by a processor, comprising:

a program code arrangement having program code for operating a brake system for acquiring at least one status variable for controlling the brake system, by performing the following:

testing whether a switch-over condition is satisfied, wherein the brake system includes:

a primary control means for controlling the brake system by at least one actuator and taking into account the at least one status variable; and a redundancy control means for controlling the brake system by part of the at least one actuator and taking into account part of the at least one status variable;

wherein the brake system is configured such that, when at least one switch-over condition is satisfied, the brake system is no longer controlled exclusively by the primary control means and is at least partially controlled by the redundancy control means; and changing over the control of the brake system from the primary control means at least partially to the redundancy control means when a switch-over condition is satisfied.

17. The brake system of claim 1, wherein the primary control means and the redundancy control means are separate electronic control units.

18. The brake system of claim 17, wherein the primary control means is supplied with electrical energy via a primary supply source, and the redundancy control means is supplied with electrical energy via a redundancy supply source.

19. The brake system of claim 18, wherein the primary control means is connected by a primary control connection, which is embodied as an electronic control connection via which the primary control means controls a plurality of components of the brake system electronically.

20. The brake system of claim 19, wherein the primary control means is connected to a foot brake module, a pressure generator and pressure controllers, and wherein the primary control means is also connected via the primary control connection to rotational speed sensors and/or pressure sensors for sensing a brake pressure so that rotational speed signals of wheels or brake pressures which are present at brakes are transmitted to the primary control means.

21. The brake system of claim 18, wherein the redundancy control means is connected by a redundancy control connection, which is embodied as an electronic control connection, via which the redundancy control means is controls a plurality of components of the brake system electronically.

22. The brake system of claim 21, wherein the redundancy control means is connected to pressure controllers and a control device, and wherein the redundancy control means is also connected to rotational speed sensors and/or pressure sensors for sensing brake pressure, so that rotational speed signals of wheels or brake pressures which are present at brakes are transmitted to the redundancy control means.

* * * * *